United States Patent Office 2,889,267
Patented June 2, 1959

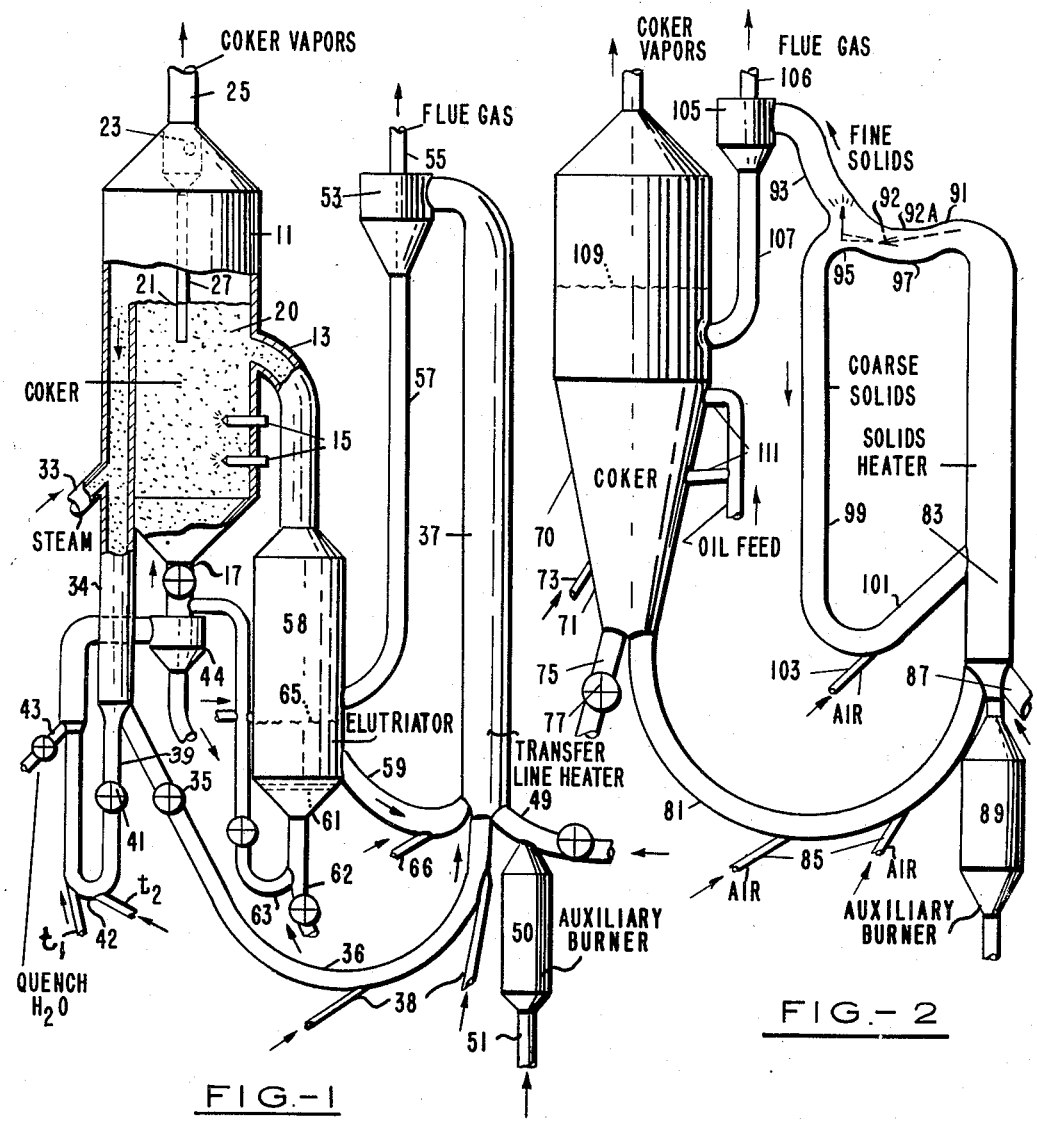

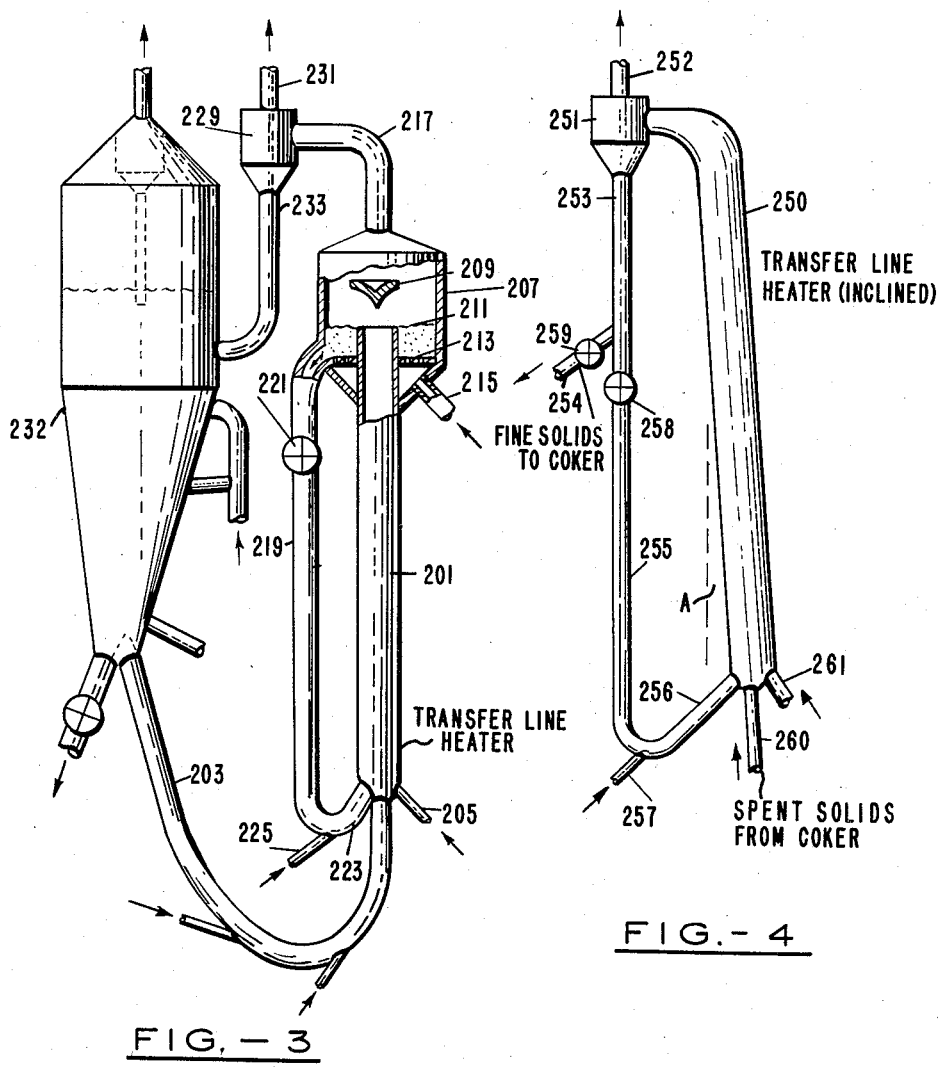

2,889,267
PROCESS FOR CRACKING OIL

Frank T. Barr, Summit, Harvey E. W. Burnside, Locust, James W. Brown, Mountainside, Charles E. Jahnig, Rumson, and Homer Z. Martin, Cranford, N.J., assignors to Esso Research and Engineering Company, a corporation of Delaware Application December 31, 1953, Serial No. 401,462

6 Claims. (Cl. 208—127)

The present invention relates to a process and apparatus for carrying out high temperature reactions. It pertains especially to a process and apparatus for the conversion of heavy residual oils to more volatile products, and coke, by contacting such oils with a mobile mass of preheated solid particles. The invention is particularly concerned with the efficient preheating or reheating of solid particles which are used as heat carriers. It is concerned also with the efficient utilization of various solid particles, especially the more finely divided solid particles in the system. While the invention has utility for several purposes, it will be described as applied to the conversion of heavy oil to more volatile products.

Various proposals have been made in the past for converting heavy hydrocarbon oils, especially residua, to more valuable products. Residual oils are of relatively low economic value and petroleum refiners have need for efficient means to convert them. Demand for heavy residuum as a fuel has gradually decreased while demands for gasoline, heating oil, diesel fuel and the like have steadily increased. Residual oils also may be converted to gaseous olefins, etc., of considerable value. It has become increasingly important to accomplish such conversion even at the expense of converting a substantial proportion of the feed to coke. The coke itself, when of proper quality, finds an increasing market in various industrial fields.

One of the most satisfactory general processes for converting heavy oils such as residua from petroleum crude is the fluid solids bed process. In this process, the feed is sprayed or otherwise finely dispersed into a dense turbulent or "fluidized" mass of finely divided solid particles which have been preheated to a suitable temperature. These solid particles are preferably inert, catalytically, since their function is primarily to vaporize and thermally crack the feed. Such catalytic action as they may have is usually quickly lost. Materials such as sand, pumice, artificial granules such as Carborundum, metal shot, ceramic beads, etc., may be used, as the heat carrying solids although petroleum coke particles produced in the process are currently preferred.

As the market for petroleum coke expands, other solids may be used, or the coke particles may be preheated without substantially consuming them. At present, however, petroleum coke has the advantage of being of fairly low economic value and having good heat carrying and transfer characteristics. Since it is combustible, it may provide its own energy for preheating or reheating. Hence coke particles of optimum fluidizable size and good heat carrying properties are often preferred. The particles, of whatever material, are preferably in the general particle size range of 20 to 400 microns average diameter, those of about 40 to 200 microns being particularly desirable as components for a fluid bed.

In coking heavy hydrocarbon oils, the hot particles, e.g. coke, are coated with a thin film of fresh feed and this evaporates and/or is cracked in situ on the particles. A layer of carbonaceous residue is deposited upon each hot coated particle, so the particles tend to increase in size. In a given reactor the total mass of solids in the fluid bed must remain substantially constant, hence coke must be withdrawn from the bed and disposed of about as fast as it is formed. Also, if the particles increase in size, fewer particles can remain in a given bed volume. For optimum effectiveness, the particles should be small (to present a large surface area). The required control of particle size can be obtained by adding a sufficient number of relatively fine particles to serve as nuclei or "seed" coke while withdrawing or otherwise disposing of larger particles.

One object of the present invention is to remove relatively large coke particles from the coking bed and return smaller particles to the bed, while at the same time supplying heat requirements for the coking operation which is quite endothermic. Hot solids, at a temperature of 1100 to 1300° F. or so, are supplied to the bed at such a rate as to maintain the desired operating temperature of 900 to 1000° F., or so, needed for product motor fuels and gas oils. Higher temperatures are needed for production of gaseous olefins, etc.

Spent solids may be returned to a heater or burner for reheating at a temperature of 900° to 975° F. or even up to 1000° F. or more. However at these temperatures, combustion is rather slow. Solids may be contacted with air at these temperatures and combustion will proceed but it proceeds slowly. It is highly advantageous to partially burn the solids quickly in a simple transfer line burner of reasonable length.

In order to raise the temperatures of the spent solids returning at temperatures below 1000° F. to a suitable level, e.g. 100° to 300° F. or so above their spent temperature by normal combustion, the burning time and consequent hold-up of solids in a burner must be relatively great. Combustible fuel such as natural gas, hydrogen, CO, or torch oil, etc., could be and sometimes is used to speed up the reheating. However, these fuels are not always available or, if available, may be too valuable for such use.

Hence a further object of the present invention is to speed up the preheating or reheating of these solids without excessive hold-up and without use of auxiliary fuels or at least with a minimum thereof. According to the present invention this is accomplished in such a way as to return a maximum of the finer solid (i.e. coke) particles, unconsumed but properly heated, to the reactor, while preferentially burning larger particles. Thus the invention contemplates a combination of features, including selectively recycling partially heated coke particles of larger than average size directly to the heater to speed up reheating while selectively returning hot particles of smaller than average size to the coking operation to serve more effectively as heat carrying media and "seed" coke. The selection of fine and coarse particles, respectively, is made automatically by simple means within the circulatory system.

Thus, according to the invention, a rough cut is made of coke particles which have passed through the heater or burner, to recycle the larger particles, on the average, to the burner and to pass the smaller particles immediately back to the coking operation. The larger particles are perferentially consumed as they are recycled, until they are reduced to smaller size and pass to the reactor. The smaller particles, which have less tendency to be recycled in the heater are returned to the coking reactor where they supply heat, and provide extensive surface on which the coking reaction takes place. The average temperature in the burner is, of course, higher than in the reactor. By means of recycling in the burner, the effective reaction rate is increased for a given degree or range of reheating. As a consequence, burner capacity, and the investment required for such capacity, can be measurably reduced. It has previously been suggested that certain solids be recycled in the reactor but in the present invention recycling takes place entirely outside and away from the coker unit. The recycling, moreover, is accompanied by a simple, rough, but effective separation of coarse solids for heater recycle and finer solids for coker supply, as mentioned above. The use of auxiliary fuel is reduced or dispensed with altogether without sacrificing burner efficiency. The solids inventory, and the consequent investment expense outside the coker, is reduced. Also in the present system the material recycled to the burning zone is a combustible material subjected to high combustion temperature which aids in obtaining the required heat and combustion in the short time available.

Preferably, burning takes place in a disperse phase in a transfer line burning operation. This has the advantage of greatly reducing the size and cost of the burner equipment. Also the combustion air can be supplied at much lower pressure than with a conventional bed burner. This results in a large saving in investment and operating cost. Although the solids hold-up in the transfer line will be much less, the detrimental effect of this on combustion rate can be readily offset by using the higher burner temperature.

A further advantage is that the transfer line burner can more readily be lined effectively with refractory materials. The higher average burner temperature may also tend to increase porosity and hence total surface area of the coke particles. As larger particles are consumed, some of them are reduced in size to a point where they return selectively to the coker and their high surface area is especially effective. This reduces the amount of seed coke required; otherwise it may be necessary to supply large quantities of coke by grinding, etc.

The invention and its objects and advantages will be more clearly understood by referring in detail to specific embodiments thereof. For this purpose, the attached drawings will next be considered.

In the drawings,

Fig. 1 shows in elevation, partly in section and partly diagrammatically, a coking system embodying one form of the invention.

Fig. 2 is another embodiment somewhat similar to Fig. 1, wherein the large and small particles are separated roughly by taking advantage of centrifugal force and their differing inertia.

Fig. 3 is a diagrammatical view in elevation of another system wherein rough separation is accomplished by elutriation at the burner.

Fig. 4 is a fragmentary view, in elevation, of the burner side of a coking system wherein the transfer line or suspension type burner is inclined for automatic internal recycle of the coarse solids.

Referring first to Fig. 1, there is shown a more or less conventional fluid bed coker vessel 11 into which preheated solids, such as coke particles, are fed by a line 13 in and the oil to be coked, preferably preheated, is fed in through one or preferably several nozzles 15. A fluidizing gas such as steam is introduced into the bottom part of the vessel, e.g. through a line 17, to form a fluid bed 20 having a relatively definite upper level 21. The oil is coked in this bed, which is at coking temperature as mentioned above, and the vapors and gases pass upwardly and out of the vessel through a cyclone 23 and outlet 25 to suitable recovery apparatus, not shown. Entrained solid particles in the gas stream are removed by cyclone 23 and returned to bed 20 through solids return line 27.

As the coking operation is endothermic, heat must be supplied to the coking reactor, and this is done by recirculating solids through a heater. A stripping gas such as steam is introduced through a line 33 into the lower part of the stripper to remove occluded hydrocarbon gases and vapors from the outflowing solids. The latter pass into a standpipe 34, under control of a valve 35 from whence they pass via a return bend or loop 36 into a transfer line burner 37. The solids passing through the bend 36 are kept fluid by aerating gas such as air introduced through one or more lines 38.

Product coke may be withdrawn continuously or intermittently through a quenching system which includes line 39 controlled by valve 41 and a return loop or U-bend 42 into which steam may be introduced through lines $t_1$, $t_2$ If desired, this product coke may be cooled by injecting a stream of water through line 43. The steam thus generated may be used in lieu of or supplementary to the steam introduced through lines 17, 33 and 62. Thus quenching can be done in a separate zone or vessel, and the steam separated from the cooled solids in a cyclone or settler 44.

Coke not withdrawn from the system is passed through the line 36 to a transfer line heater 37 previously mentioned. Suitable gas such as air for supporting combustion of the coke may be introduced through suitable lines, one of which is indicated at 49. An auxiliary burner for starting up is indicated at 50, fed with fuel and air through a line 51. The air from line 49 may be mixed, if desired, with an extraneous fuel such as gas or oil, introduced therewith or through the auxiliary burner.

The transfer line heater 37 is of such length and diameter as to provide the required degree of burning and reheating to sustain the coking operation. It is preferably lined with refractory material since its operating temperature may be as high as 1500° F. or higher. Gas velocity is high enough to keep the solids moving upwardly in dispersed phase, with a solids density of 0.2 to 20 pounds per cubic foot. During passage through this heater, the solid particles are partially burned and/or reheated and such particles, together with the combustion gases, are passed into a cyclone or separator 53. The flue gases pass overhead through outlet 55 and the separated solids flow downwardly through line 57. The solids from line 57 are passed into an elutriator 58 for the purpose of roughly separating the fine particles from the coarse. The fine hot particles are returned to the coker through line 13 in such volume as to supply the necessary heat for the coking operation. The coarse solids are recycled through a line 59 in the form of a U-bend or other loop, to the burner 37. Elutriation is accomplished by forming a fluid bed in the elutriator 58, supported upon a grid 61 through which an elutriating gas such as steam is forced from a line 62. Part or all of this steam may be supplied by a line 63 from the coke quenching operation. Gas or steam velocity through the grid is sufficient to carry the fine particles, suitable for "seed" in the coking operation, upwardly into line 13. The coarser particles which form a fluid bed 65 can be withdrawn by gravity into line 59. Suitable aerating gas such as air may be supplied to line 59 by one or more lines 66.

The weight ratio of solids recycled to the heater to solids returned to the coker should be adjusted to obtain the desired temperatures in the respective heating and coking zones. To maintain a fluid bed at a desired coking temperature a certain flow of hot solids at a given temperature is required. A burner inlet temperature of about 1200° to 1250° F., on the other hand, is found to be desirable for good burner efficiency. Assuming a burner outlet temperature of 1500° F., for example, the ratio of solids recycled to the heater to solids led from coker to heater, should be between 0.5 and 1.2. The optimum recycle ratio in some cases appears to be even higher. This means that one-third to considerably more than half of the solids in line 57 should be recycled to the burner for good thermal efficiency.

Referring now to Fig. 2, the coker side of the system is more or less equivalent to that of Fig. 1. The coker vessel 70, however, is shown as having a tapered lower section, the bottom portion of which serves as a stripper 71. Stripping steam is supplied through a line 73. Product coke may be withdrawn through outlet line 75 under control of valve mechanism 77. Solids to be reheated are returned through a U-bend or other suitable return line 81 to the transfer line heater 83. Suitable aerating gas taps are provided at 85. Air for combustion is supplied to heater 83 through a line 87. An auxiliary burner 89 is provided for starting up or for supplying heat requirements when combustion of the solids is not wanted.

The outlet 91 of heater 83 is curved and bifurcated to from two branches 93 and 95. An adjustable vane or deflector 97 is so arranged that it may split the stream of effluent, containing entrained hot solids, in any desired ratio. The outlet line 91 is doubly curved laterally 50 to 100° or more and then curved upwardly through an arc of 50 to 90° or so. Its radius of curvature is such, in relation to the stream velocity, that most of the larger solid particles follow the line of arrow 92 toward and fairly closely along the lower or outer wall or bend 95 by centrifugal force. Hence a rough separation of the coarser solids from the finer in a desired ratio may be effected by adjusting the vane 97. The bend 95 carries the coarser solids into a recycle line 99 from whence they are returned to the heater via a loop or bend 101. An air line 103 is provided to assist in recycling the coarse solids to the burner. Alternatively, and to minimize remixing of fine and coarse solids, a funnel or scoop, not shown, may be set in line 91 at about point 92A and a conduit extended along arrow 92 to collect and divert the coarse solids from the outer upper bend. An air jet may be introduced into this scoop, if desired, to accelerate the deflection of the coarse particles into the recycle line.

The finely divided solids roughly separated by vane 97 or the scoop, etc., from the coarser solids flow laterally or upwardly into a cyclone separator 105. Here the flue gas passes overhead through a line 106 and the separated solids of fine particle size are returned to the coker through line 107 to form fluid bed 109 to which oil is fed through lines 111.

In Fig. 3 the coker arrangement is generally the same as in Fig. 2 and the recycle of solids to the heater is similar. Solids from coker 232 are taken to the solids heater 201 through a line 203. Air, with or without auxiliary fuel, is supplied through a line 205. Combustion and heating take place in heater 201 and the flue gases with entrained solids pass upwardly through the transfer line heater with sufficient velocity to prevent back flow of any substantial part of the solids. The heater terminates in a vessel or conduit element 207 of increased cross-section so that the stream velocity is reduced. The incoming stream of solids strikes a baffle 209 which deflects them toward a fluidized bed 211. A grid 213 supports bed 211. A fluidizing gas from line 215, such as steam or air, keeps bed 211 fluidized and elutriates the finer particles overhead into exit line 217. The coarser particles remain in the bed and are drawn off by gravity through recycle line 219 under control of a valve 221. From here they return to the burner through riser 223, with the aid of air admitted through a line 225.

The flue gases and the finer particles are taken to a cyclone or separator 229. From here the flue gases pass overhead through a line 231 and the solids return to the coker vessel 232 through a line 233.

In Fig. 4 an arrangement is shown wherein the transfer line burner is inclined slightly from the vertical to permit internal recycle. The burner 250 is of the same general construction as burner 37 of Fig. 1 but its angle of inclination is such that the coarser solids, as they rise, tend to strike the wall and slide down against the impelling gas stream while the more finely divided and therefore more buoyant particles are carried into cyclone separator 251. Here the latter are separated from gases which pass overhead through line 252, the solids flowing down through line 253 and branch line 254 to a coker vessel, not shown. Inclination is 2 to 10° from vertical.

Part of the separated solids may also be recycled through a line 255 to the burner, through a return bend or riser 256. Aerating or lifting gas is added from a line 257. Valves 258 and 259 control the flow of finely divided particles to the recycle and the coker respectively. It will be understood that coke particles from the coker (not shown) may be returned to the heater through a line 260 and that air and/or heating fuel may be introduced through a line 261 as in the other modifications previously described.

In all modifications of the invention, as described above, there is a separation, or at least a rough or partial separation of coarse solid particles which are recycled to the burner and finer particles which are returned to the coker. The latter are desirable as seed coke or solid nuclei in the coking process. The recycled coarser solid particles maintain a high average operating temperature in the burner, reducing its size and enhancing its efficiency. At the same time the coarser solids, by recycling, are burned in preference to the finer particles which are needed in the coker. The average temperature of the solids returned to the coker is high and their volume, therefore, need not be too great. By operating the coker cyclone so as to permit some entrainment of solids, the outlet lines may be kept clear of coke and other objectionable deposits. In other respects, the system operates according to well established operating characteristics for fluid solids cokers.

It will be obvious to those skilled in the art that various modifications may be made without departing from the invention. The system may be adapted to operations other than coking. Aeration and/or combustion gases may be introduced at required points and various means for dividing and recycling the solids may be devised.

What is claimed is:

1. The process of coking a heavy hydrocarbon oil, which comprises establishing a fluidized bed of finely divided preheated solid particles in a reaction zone, distributing the oil as a film on said solid particles to crack and vaporize it and form a carbonaceous coating on the particles, continuously removing a stream of coated particulate solids and passing them in disperse phase continuously upward through a transfer line heater at sufficient velocity to keep substantially all the particles entrained in the form of a disperse solids-gas stream, passing a combustion-supporting gas with said particles through the heater to burn the carbonaceous coating material and to reduce the size of the particles and reheat them, roughly separating the effluent stream of heated solids leaving the transfer line heater into coarse and fine particles, recycling the hot coarse particles directly to the inlet of the heater to maintain high heater temperature, and returning the hot fine particles to the fluidized bed in the reaction zone.

2. Process according to claim 1 wherein the ratio of solids recycled to the solids brought to the heater from the coking reaction is between 0.5 and 1.2.

3. Process according to claim 1 wherein at least one-third of the total solids removed from the coker are recycled in the heater.

4. Process according to claim 1 wherein the rough separation is effected by elutriating the fine particles with the combustion product gases.

5. Process according to claim 1 wherein coarse particles are separated from finer particles by centrifugal force.

6. The process of cracking hydrocarbon oil, which comprises establishing a fluidized bed of finely divided preheated solid particles in a reaction zone, distributing the oil as a film on said solid particles to crack and vaporize it and form a carbonaceous coating on the particles, continuously removing a stream of coated particulate solids and passing them in disperse phase continuously upward through a transfer line heater at sufficient velocity to keep substantially all the particles entrained in the form of a disperse solids-gas stream, passing a combustion-supporting gas with said particles through the heater to burn the carbonaceous coating material and to reduce the size of the particles and reheat them, roughly separating the effluent stream of heated solids leaving the transfer line heater into coarse and fine particles, recycling the hot coarse particles directly to the inlet of the heater to maintain high heater temperature, and returning the hot fine particles to the fluidized bed in the reaction zone.

References Cited in the file of this patent

UNITED STATES PATENTS

| | | |
|---|---|---|
| 2,362,270 | Hemminger | Nov. 7, 1944 |
| 2,471,104 | Gohr | May 24, 1949 |
| 2,534,728 | Nelson et al. | Dec. 19, 1950 |
| 2,602,019 | Odell | July 1, 1952 |
| 2,608,526 | Rex | Aug. 26, 1952 |
| 2,618,544 | Fischer et al. | Nov. 18, 1952 |
| 2,655,464 | Brown et al. | Oct. 13, 1953 |
| 2,661,324 | Leffer | Dec. 1, 1953 |
| 2,736,687 | Burnside | Feb. 28, 1956 |
| 2,773,811 | Nicholson et al. | Dec. 11, 1956 |